Figures 3, 4:
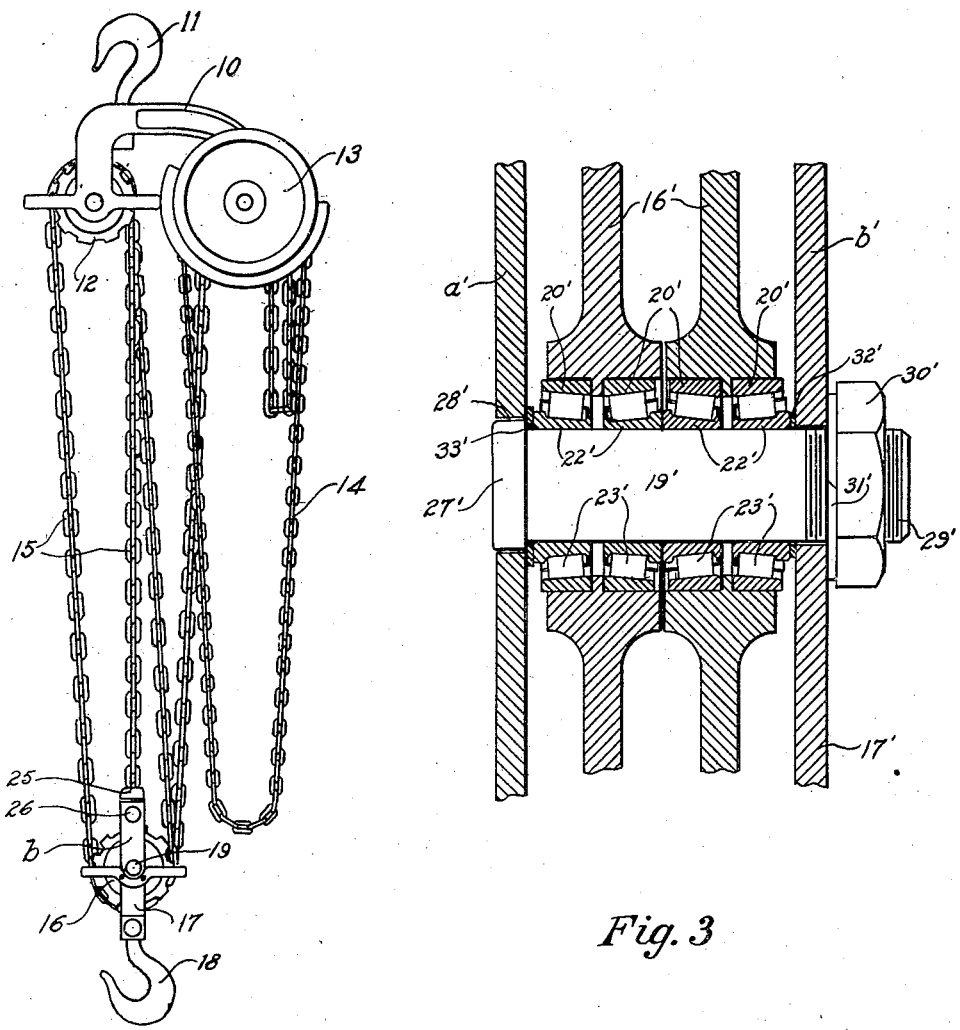

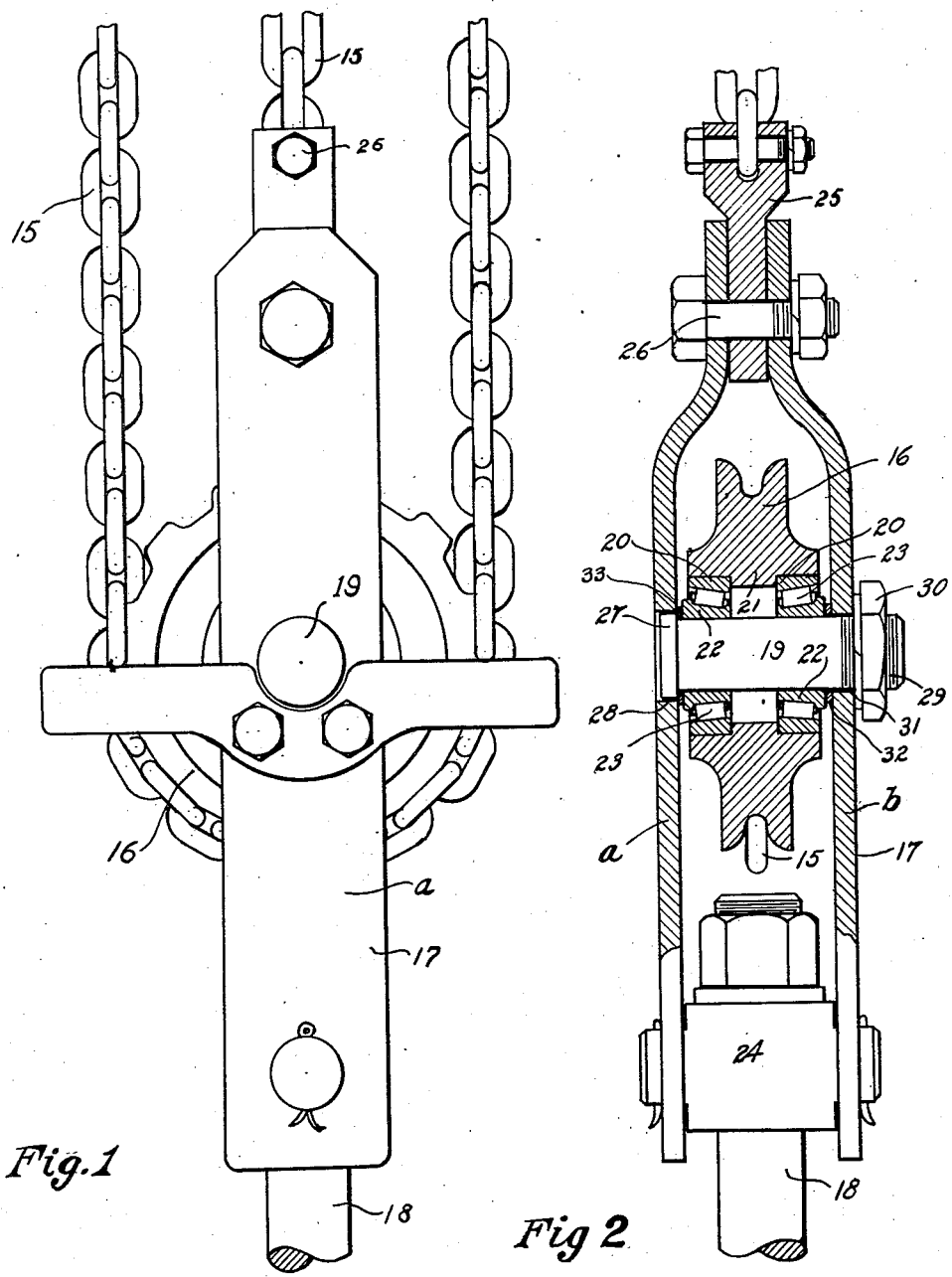

Oct. 8, 1946.   H. F. WRIGHT   2,408,899
TAKE-UP FOR ROLLER BEARINGS
Filed March 5, 1945   2 Sheets-Sheet 2

Inventor
Hal F. Wright
By
Frease and Bishop
Attorneys

UNITED STATES PATENT OFFICE 2,408,899

TAKE-UP FOR ROLLER BEARINGS

Hal F. Wright, Lisbon, Ohio, assignor to Chester Manufacturing Company, Lisbon, Ohio, a firm composed of Hal F. Wright and Mary T. Wright Application March 5, 1945, Serial No. 581,124

4 Claims. (Cl. 308—208)

The invention relates to means for taking up play in tapered roller bearings and is adapted for use in pulleys, wheels, sprockets or other rotatable members mounted upon an axle or shaft with tapered roller bearings interposed therebetween.

The object of the invention is to provide means whereby the axle or shaft may be adjusted longitudinally to take up play in the roller bearings without any change in relative positions of parts of the frame or other support in which the rotatable members are mounted.

Another object is to provide a roller bearing take-up of this character in which the sprocket or other rotatable member is provided with an internal annular rib against which the ends of the roller bearing cups abut.

A further object of the invention is the provision of such a roller bearing take-up in which the axle or shaft is provided at one end with a head fitting within a correspondingly shaped opening in the frame or supporting member so that the axle or shaft may be adjusted longitudinally within the frame or supporting member without moving any part thereof.

A still further object is to provide a roller bearing take-up of this character in which spaced roller bearing cones are mounted upon the axle or shaft, one cone abutting against the frame or supporting member and the other cone abutting against the head or shoulder on the shaft, the cups of the roller bearings being mounted in the sprocket or other rotatable member and abutting against an internal annular rib therein, a nut being provided upon the other end of the axle or shaft for longitudinally adjusting it within the frame or supporting member to take up play in the roller bearings.

Another object of the invention is to provide a roller bearing take-up of this character in which two or more roller bearing mounted wheels or other rotatable members may be mounted upon a shaft or axle, and play in all of the bearings may be simultaneously taken up by longitudinal adjustment of the shaft or axle.

A further object is to provide a roller bearing take-up of this character especially adapted for taking up play in tapered roller bearings within the sprocket wheels of a chain hoist.

The above objects together with others which will be apparent from the drawings and following description, or which may be later referred to, may be attained by constructing the improved roller bearing take-up in the manner illustrated in the accompanying drawings, in which:

Figure 1 is a side elevation of the load sprocket of a chain hoist;

Fig. 2 a vertical, transverse sectional view therethrough showing the improved roller bearing take-up as applied to the roller bearings of a single sprocket wheel;

Fig. 3 a fragmentary vertical transverse sectional view through a dual sprocket provided with the improved roller bearing take-up, and Fig. 4 a side elevation of a form of chain hoist to which the invention may be applied.

Although the invention may be applied to any mechanism in which a wheel, pulley, sprocket or other rotatable member is journalled upon a shaft or axle by means of tapered roller bearings, for the purpose of illustration the improved take-up is shown as applied to the sprockets in a chain hoist.

In Fig. 4 is shown one type of chain hoist to which the invention is applicable and which comprises the upper yoke 10 having the hook 11 for suspending the hoist from a stationary or movable support, the upper sprocket 12 and the hand wheel 13 being journalled upon said yoke.

The usual hand chain 14 is shown associated with the hand wheel 13 and the usual load carrying chain 15 is shown associated with the upper sprocket 12, and the load sprocket 16, which is mounted in the frame 17 in the lower end of which is swiveled the load carrying hook 18.

The sprocket 16 is rotatably mounted upon the axle or shaft 19 by means of tapered roller bearings comprising the cups 20 mounted within the sprocket and separated by the internal annular rib 21 therein, and the cones 22 mounted upon the shaft or axle 19, the usual tapered rollers 23 being interposed between the cups and cones of the bearings.

The frame or bracket 17 is formed of two similar members indicated at a and b respectively, connected in spaced relation at their lower ends by means of the stub shaft 24 through which the lower hook 18 is swiveled and connected at their upper ends to the clevis 25 by means of a bolt 26.

In order to take up play in the tapered roller bearings without disturbing the relative positions of the frame members a and b the shaft or axle 19 is provided at one end with a head or shouldered portion 27 fitting within a correspondingly shaped opening 28 in the frame member a, the other end of the shaft or axle being screw threaded as at 29 and provided with a nut 30 to be tightened against the outer side of the frame member b, a lock washer 31 being preferably interposed between the nut and the frame member $b$.

If desired a washer 32 may be interposed between the inner side of the frame member $b$ and the adjacent bearing cone 22, and a similar washer 33 may be interposed between the head 27 of the shaft or axle and the other cone 22.

From the above it will be seen that in order to take up any play in the tapered roller bearings the nut 30 may be tightened upon the shaft or axle 19, the head 27 bearing against the adjacent cone 22, taking up any play in that bearing, and through the rollers in that bearing and the cone 20 thereof, bearing against the internal rib 21 of the sprocket 16, said sprocket will be moved slightly to the right and the cup 20 of the right hand bearing as viewed in Fig. 2 is thus moved relative to the cone 22 of said bearing taking up the play therein.

As the head 27 of the shaft or wheel slides within the opening 28 in the frame member $a$ it will be seen that the roller bearings are properly taken up without changing the relative position of the frame members $a$ and $b$.

In Fig. 3 is shown the manner in which two or more sprockets or other rotatable members may be mounted upon a single shaft or axle and play in all of the roller bearings may be simultaneously taken up by means of the same invention as above described.

In this view the frame 17' may comprise the frame members $a'$ and $b'$ and the shaft or the axle 19' is provided with a head 27' slidably fitting within the opening 28' in the frame member $a'$.

The sprockets 16' are mounted upon the shaft or wheel by means of tapered roller bearings comprising the cones 22' upon the shaft or axle and the cups 20' within the sprockets, the tapered rollers 23' being interposed therebetween.

The nut 30' may be mounted upon the screw threaded end 29' of the shaft or axle with a lock nut 31' interposed between the nut and the outer side of the frame member $b'$, and a washer 32' may be interposed between the inner side of the frame member $b'$ and the adjacent cone 22', while a washer 33' may be interposed between the inner surface of the frame member $a'$ and the adjacent cone 22'.

With this construction, in order to take up play in the bearings, it is only necessary to tighten the nut 30', the play in the bearings of both sprockets being taken up in the same manner as above described where a single sprocket is journalled upon the shaft or axle.

I claim:

1. A take-up for roller bearings including a frame comprising spaced frame members, a shaft located through said frame members and having a head upon one end, one frame member having an opening in which said head is located, the other end of the shaft being threaded and extending through an opening in the other frame member, a nut upon said threaded end of the shaft abutting the outer side of the adjacent frame member, spaced roller bearing cones mounted upon the shaft, one cone abutting the last named frame member and the other cone abutting the head upon the shaft, a rotatable member surrounding the shaft, spaced cups within the rotatable member, and rollers between the cups and cones.

2. A take-up for roller bearings including a frame comprising spaced frame members, a shaft located through said frame members and having a head upon one end, one frame member having an opening in which said head is located, the other end of the shaft being threaded and extending through an opening in the other frame member, a nut upon said threaded end of the shaft abutting the outer side of the adjacent frame member, spaced roller bearing cones mounted upon the shaft, one cone abutting the last named frame member and the other cone abutting the head upon the shaft, a rotatable member surrounding the shaft, an internal rib in the rotatable member, spaced cups within the rotatable member abutting opposite sides of said rib and rollers between the cups and cones.

3. A take-up for roller bearings including a frame comprising spaced frame members, a shaft located through said frame members and having a head upon one end, one frame member having an opening in which said head is located, the other end of the shaft being threaded and extending through an opening in the other frame member, a nut upon said threaded end of the shaft abutting the outer side of the adjacent frame member, spaced pairs of roller bearing cones mounted upon the shaft, the innermost cone of each pair abutting the adjacent cone of the adjacent pair, one outermost cone abutting the last named frame member and another outermost cone abutting said head, a rotatable member surrounding each spaced pair of cones, spaced cups within the rotatable members and rollers between the cups and cones.

4. A take-up for roller bearings including a frame comprising spaced frame members, a shaft located through said frame members and having a head upon one end, one frame member having an opening in which said head is located, the other end of the shaft being threaded and extending through an opening in the other frame member, a nut upon said threaded end of the shaft abutting the outer side of the adjacent frame member, spaced pairs of roller bearing cones mounted upon the shaft, the innermost cone of each pair abutting the adjacent cone of the adjacent pair, one outermost cone abutting the last named frame member and another outermost cone abutting said head, a rotatable member surrounding each spaced pair of cones, an internal rib in each rotatable member, spaced cups within the rotatable members abutting opposite sides of said ribs and rollers between the cups and cones.

HAL F. WRIGHT.